United States Patent [19]
Tanaka

[11] Patent Number: 5,995,717
[45] Date of Patent: Nov. 30, 1999

[54] IMAGE FORMING APPARATUS

[75] Inventor: Toshiaki Tanaka, Fukaya, Japan

[73] Assignee: Kabushiki Kaisha Toshiba, Kawasaki, Japan

[21] Appl. No.: 08/982,353

[22] Filed: Dec. 2, 1997

[30] Foreign Application Priority Data

Dec. 2, 1996 [JP] Japan .................................. 8-321647

[51] Int. Cl.$^6$ .............................. B41B 15/00; B41J 2/385
[52] U.S. Cl. .................... 395/109; 395/109; 395/104; 395/101; 395/105; 395/111; 347/116; 347/117; 347/138; 347/154; 347/234; 347/118; 347/119
[58] Field of Search .................................. 395/109, 104, 395/101, 105, 111; 347/116, 117, 138, 154, 234, 118, 19; 346/44, 46, 134, 136; 399/301, 28, 49, 299; 358/296, 298, 300, 526; 226/27, 35, 15

[56] References Cited

U.S. PATENT DOCUMENTS

| 4,916,547 | 4/1990 | Katsumata et al. ..................... 358/300 |
| 5,384,592 | 1/1995 | Wong ..................................... 346/157 |
| 5,523,823 | 6/1996 | Ashikaga ................................. 399/28 |

FOREIGN PATENT DOCUMENTS 8-278680  10/1996  Japan .

*Primary Examiner*—Edward L. Coles
*Assistant Examiner*—Twyler Lamb
*Attorney, Agent, or Firm*—Foley & Lardner

[57] ABSTRACT

A color copy machine is equipped with four image forming sections for forming images of different color components based on image data items relating to separated color components. A conveyance belt is provided below each image forming section. To avoid forming of a displaced image on a recording paper sheet P conveyed by the conveyance belt, pattern data for prevention of a displaced image is synthesized with image data. Each image forming section forms color patterns on predetermined portions of the conveyance belt on the basis of the synthesized data. The main-scanning directional displacement of each color pattern can be detected by comparing the numbers of those sensed line segments of the patterns which are sensed by a sensor. Then, the image forming positions are adjusted so that the numbers of the sensed line segments will be equal to each other. Thus, the cost-effective structure enables reliable adjustment of the image forming positions for images of different color components, and hence forming of a high-quality image in which different color components desirably overlap.

7 Claims, 10 Drawing Sheets

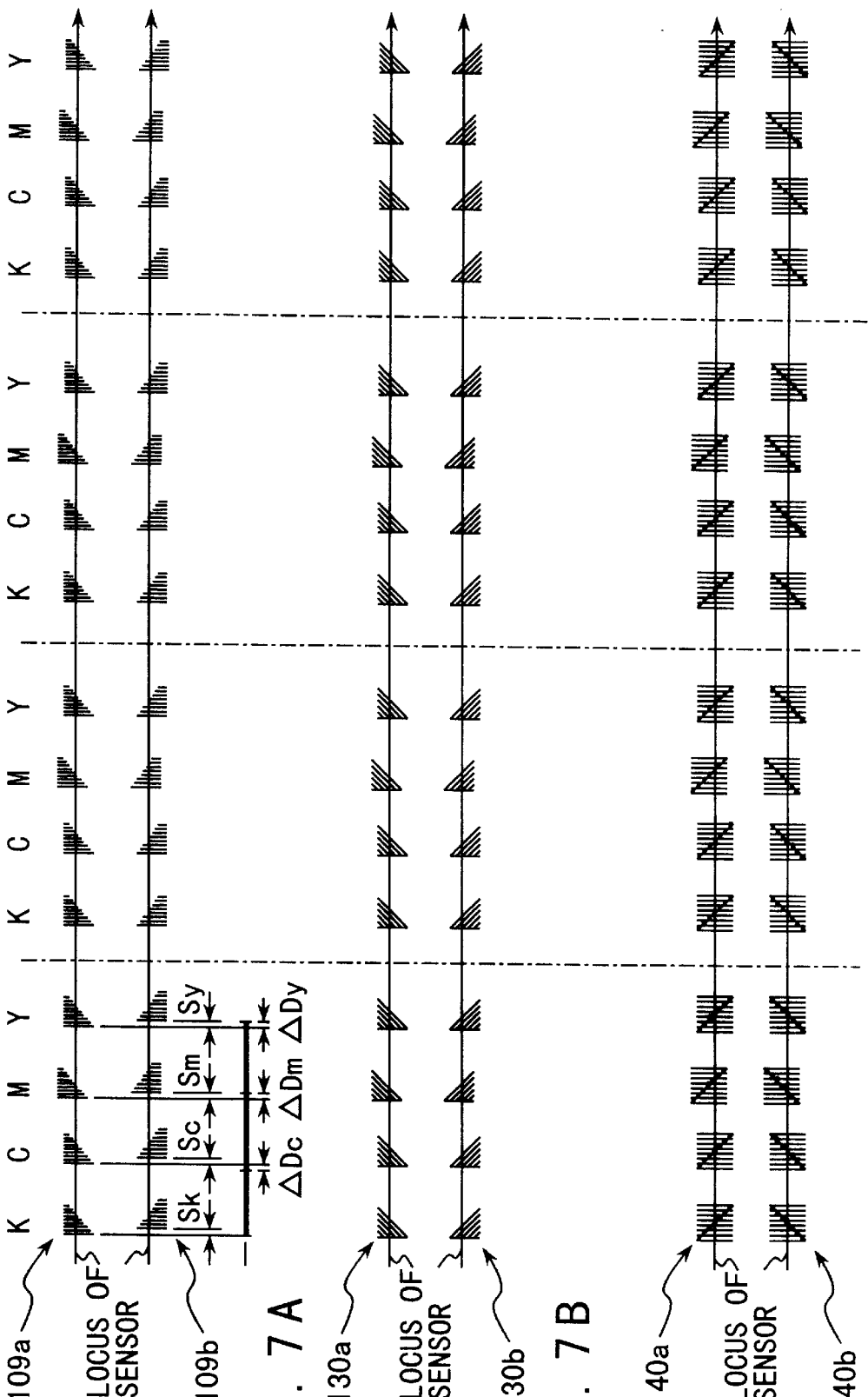

IMAGE FORMING APPARATUS

BACKGROUND OF THE INVENTION

This invention relates to an image forming apparatus such as a color printer, a color digital copy machine, etc., and more particularly to an image forming apparatus for forming each of images of basic color components on a corresponding one of a plurality of photosensitive drums and transferring the images formed on the drums to a single recording paper sheet such that the images overlap each other on the sheet, thereby obtaining a color image.

A conventional color copy machine for forming a color image, which forms toner images of different color components on a plurality of photosensitive drums and sequentially transfers the images to a single recording paper sheet conveyed by a conveyance belt, is known from, for example, Japanese Patent Application KOKAI Publication No. 6-35287.

If in this transfer-type color copy machine, toner images of different color components do not accurately overlap each other on a recording paper sheet P, a displaced color image (in which different color components undesirably overlap) will be obtained. This may be caused by intrinsic inclination or displacement of each image forming section incorporated in the machine, or by wrong image forming timing in each image forming section, or by displacement of the transfer position of the paper sheet P in which each image is transferred.

There is a conventional method for correcting such a displaced image, in which the displacement of an image transferred from each image forming section to the paper sheet P is sensed by, for example, a CCD sensor incorporated in the copy machine, thereby correcting the position of the exposure unit relative to the photosensitive drum or the positional relationship between the image forming sections to correct a blurred image. Since in this method, the positions of images of different color components to be actually transferred to the paper sheet P are sensed and corrected, the displacements of the images can reliably be corrected even where, for example, the conveyance rate of the conveyance belt varies because of its thermal expansion.

However, the CCD sensor is very expensive, and therefore the use of the sensor inevitably increases the cost of the copy machine.

Instead of the above method using the CCD sensor, a method which uses wedge-shaped patterns 261 for displacement correction as shown in FIG. 10 is disclosed by, for example, Japanese Patent Application KOKAI Publication No. 8-278680. Specifically, in this method, the patterns 261 are formed in the areas of the conveyance belt which do not carry the paper sheet P. The patterns 261 are sensed by reflection type or transmission type optical sensors 262, and the displacements of images of different color components are determined on the basis of the sensing results. Each of the patterns 261 consists of wedge pattern components corresponding to color components (Y, M, C, K) and linearly arranged at a predetermined pitch in the sub-scanning direction, i.e. in the conveyance direction of a conveyance belt 251. The wedge-shaped patterns 261 are arranged with a distance therebetween in the main-scanning direction, i.e. in the width direction of the conveyance belt 251.

In this method, the sub-scanning directional displacement can be determined by comparing the time interval at which the first line segments of pattern components which extend in the main-scanning direction are sensed, with a time constant set when the pattern components are formed.

Further, the main-scanning directional displacement can be determined by comparing the time periods required from the time points when the first line segments of pattern components are sensed to the time points when the second line segments of the pattern components which extend obliquely from the first line segments are sensed. In other words, if in the FIG. 10 case, the time period required from the time when the first line segment of a pattern component is sensed to the time when the second line segment of the pattern component is sensed is relatively long, it can be said that the pattern component is displaced toward the main-scanning directional center of the conveyance belt 251. On the other hand, if the time period required from the time when the first line segment is sensed to the time when the second line segment is sensed is relatively short, it can be said that the pattern component is displaced toward the main-scanning directional end of the conveyance belt 251.

The above-described method can detect sub-scanning and main-scanning directional displacements of an image and correct the displacements without using an expensive device such as the CCD sensor.

In the above method using the wedge-shaped patterns, however, the main-scanning directional displacement of an image cannot be corrected with high precision, although the sub-scanning directional displacement can be corrected with relatively high precision. This is because the main-scanning directional displacement of a wedge-shaped pattern is determined by comparing the time period required from the time when the first line segment is sensed to the time when the second line segment is sensed, and hence the comparison result may well contain an error due to a change in the running rate of the conveyance belt 251 or in the sensing accuracy of the optical sensors 262.

If the displacement of each image cannot accurately be corrected, images of different color components cannot be made to accurately overlap each other, resulting in a degraded, displaced image.

BRIEF SUMMARY OF THE INVENTION

The invention has been developed in light of the above-described points, and aims to provide an image forming apparatus capable of reliably correcting displacements of images of different color components using a cost-effective structure, thereby forming an unblurred high-quality color image.

To attain the object, there is provided an image forming apparatus, as specified in claim 1, for forming an image having a plurality of images overlapped in order, comprising: conveyance means for supporting and conveying a plurality of images; storage means storing first and second pattern data which each have a plurality of line segments extending parallel to each other in a direction perpendicular to a conveyance direction in which the conveyance means conveys the images; first image forming means for forming, on the conveyance means, a first pattern image based on the first pattern data stored in the storage means; second image forming means for forming, on the conveyance means, a second pattern image based on the second pattern data stored in the storage means, the second pattern image being formed such that it is located adjacent to the first pattern image in the conveyance direction; sensing means provided in a position opposed to the conveyance means for sensing the first and second pattern images which are formed on the conveyance means; and correction means for correcting the positions of the first and second images to be formed by the first and second image forming means, on the basis of sensed result of the sensing means.

According to an image forming apparatus as specified in claim 2, the sensing means detects the number of line segments which form each of the first and second pattern images.

According to an image forming apparatus as specified in claim 3, the sensing means comprises a transmission or reflection type optical sensor.

There is provided another image forming apparatus, as specified in claim 4, for forming an image having a plurality of images overlapped in order, comprising: conveyance means for supporting and conveying the plurality of images in a first direction; storage means storing first and second pattern data for outputting, onto the conveyance means, first and second pattern images which each have a plurality of line segments extending substantially parallel to each other in a direction perpendicular to the first direction; first image forming means for forming, on the conveyance means, a first image, and the first pattern image based on the first pattern data stored in the storage means; second image forming means for forming, on the conveyance means, a second image, and the second pattern image based on the second pattern data stored in the storage means and the second image being output such that it overlaps the first image, the second pattern image being output such that it is located adjacent to the first pattern image in the first direction; sensing means provided in a position opposed to the conveyance means for sequentially sensing the first and second pattern images which are formed on the conveyance means; and correction means for comparing the numbers of those line segments of the first and second pattern images sensed by the sensing means, and correcting the positions of the first and second images to be formed by the first and second image forming means, on the basis of the comparison result.

According to an image forming apparatus as specified in claim 5, the correction means controls the first and second image forming means such that the numbers of those line segments of the first and second pattern images, which are sensed by the sensing means, are equal to each other.

According to an image forming apparatus as specified in claim 6, the correction means corrects the positions of the first and second images formed by the first and second image forming means in a second direction perpendicular to the first direction.

According to an image forming apparatus as specified in claim 7, the sensing means comprises a transmission or reflection type optical sensor.

According to an image forming apparatus as specified in claim 8, the first and second pattern images output onto the conveyance means each including the plurality of line segments, which extend parallel to each other in the second direction perpendicular to the first direction, have their ends linearly arranged at regular intervals in the first direction, and have their lengths shortened in units of a predetermined amount in the first direction.

According to an image forming apparatus as specified in claim 9, the first and second pattern images output onto the conveyance means each including a first line segment extending in the second direction perpendicular to the first direction, and a plurality of second line segments obliquely extending from the first line segment parallel to each other at regular intervals.

According to an image forming apparatus as specified in claim 10, the first and second pattern images output onto the conveyance means each including a plurality of line segments extending at regular intervals parallel to each other in the second direction perpendicular to the first direction, and a plurality of dots arranged in an oblique line such that each of the dots is located between a corresponding pair of adjacent ones of the line segments.

There is provided a further image forming apparatus, as specified in claim 11, for forming an image, comprising: conveyance means for supporting and conveying the images, the conveyance means including a conveyance belt for supporting and conveying an image-bearing medium onto which the images is formed, and a pair of rollers for supporting the conveyance belt; image forming means for forming the image on the image-bearing medium; sensing means for sensing the amount of displacement of the conveyance means from a regular position of the conveyance means; and enforcement means for forcibly returning the conveyance means to the regular position when the apparatus has been switched on and/or when the sensing means has sensed that the conveyance means is displaced from a regular position by a predetermined amount or more.

According to an image forming apparatus as specified in claim 12, the enforcement means including an enforcement mechanism for urging an end portion of the conveyance belt to return the belt to the regular position when the conveyance belt is displaced in an axial direction of the rollers.

According to an image forming apparatus as specified in claim 13, the enforcement means being mounted on an end of a rotary shaft of at least one of the rollers, and returns the conveyance belt to the regular position by swinging the at least one roller about the other end of the rotary shaft toward the other roller.

There is a yet another image forming apparatus, as specified in claim 14, for forming an image having a plurality of images overlapped in order, comprising: conveyance means for supporting and conveying the plurality of images; sensing means for sensing the amount of displacement of the conveyance means from a regular position of the conveyance means; enforcement means for forcibly returning the conveyance means to the regular conveyance position when the apparatus has been switched on and/or when the sensing means has sensed that the conveyance means is displaced from a regular position by a predetermined amount or more; storage means storing pattern image data, each of first and second pattern images having a plurality of line segments extending parallel to each other in a direction perpendicular to a conveyance direction in which the conveyance means conveys the images; first image forming means for forming, onto the conveyance means, a first image, and the first pattern image based on the pattern data stored in the storage means; second image forming means for forming, onto the conveyance means, a second image, and the second pattern image based on the pattern data stored in the storage means, the second image being output such that it overlaps the first image, the second pattern image being output such that it is located adjacent to the first pattern image in the conveyance direction; sensing means provided in a position opposed to the conveyance means for sensing the first and second pattern images which are formed on the conveyance means; and correction means for correcting the positions of the first and second images to be formed by the first and second image forming means, on the basis of the sensing results of the first and second pattern images.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A, 7B and 7C show patterns according to first through third embodiments of the invention;

DETAILED DESCRIPTION OF THE INVENTION

The embodiments of the invention will be described in detail with reference to the accompanying drawings.

Figure 1:
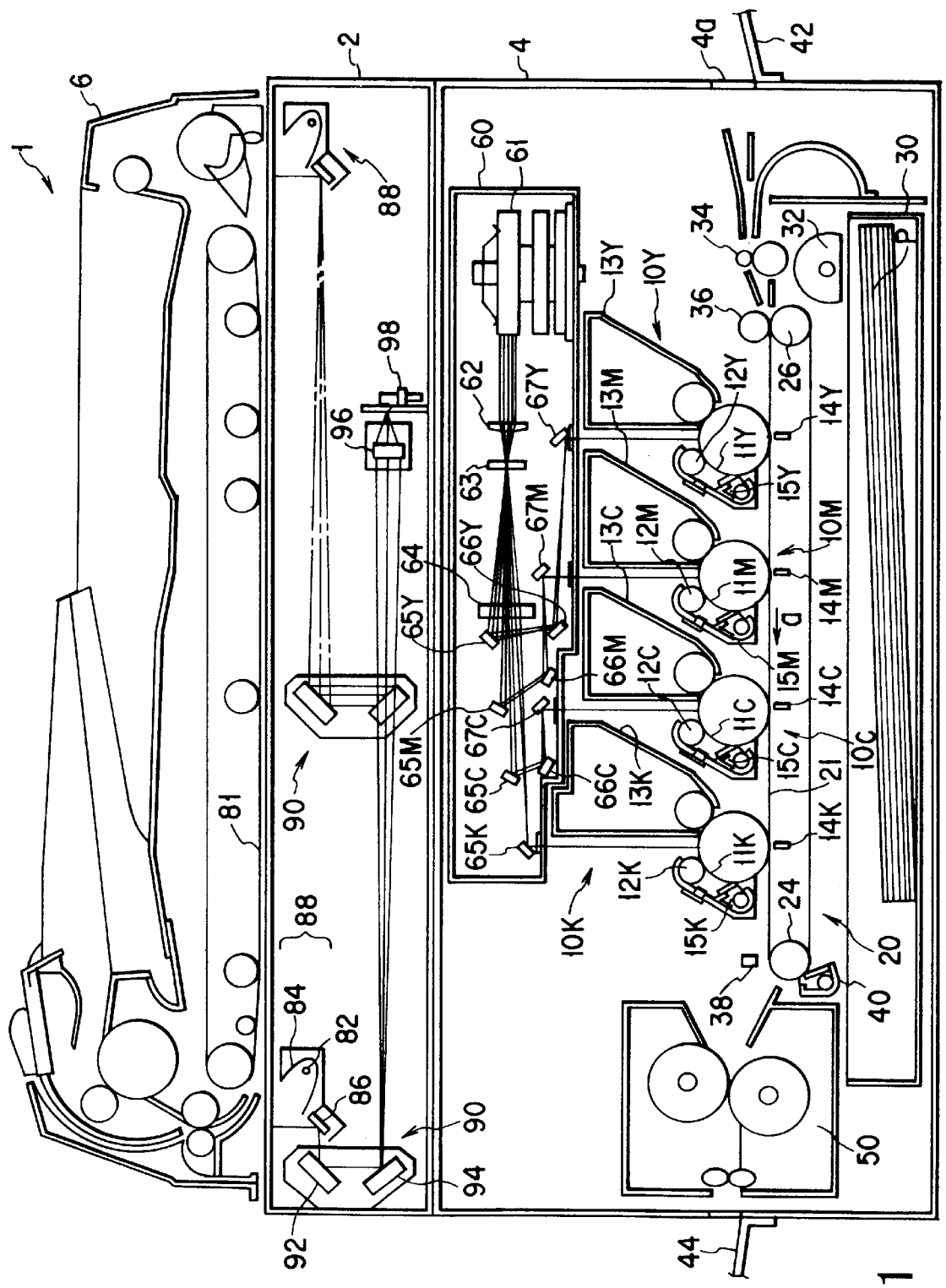
FIG. 1 is a schematic view, showing a digital color copy machine to which the embodiments of the invention are applied.
Figure 2:
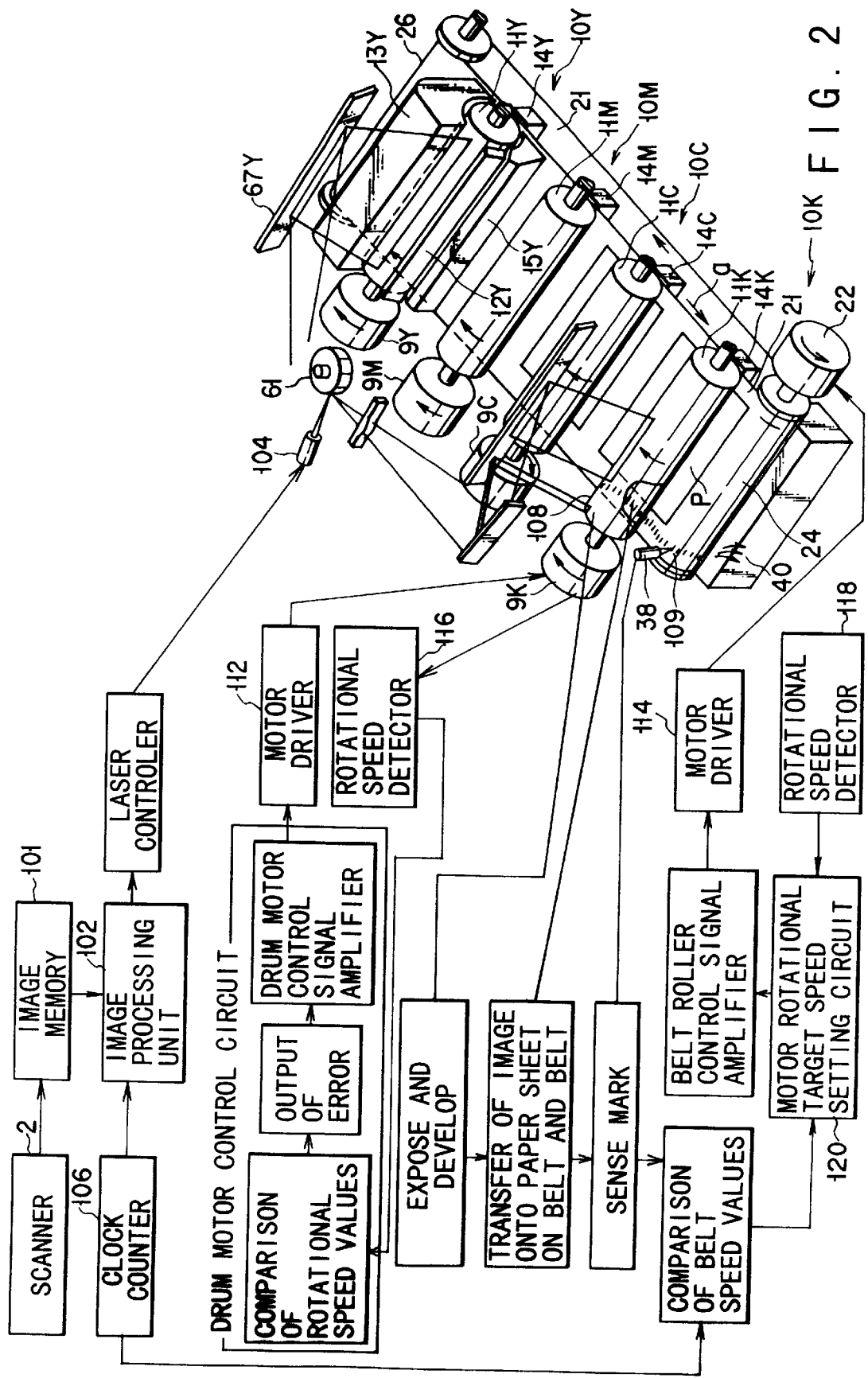
FIG. 2 is a view, showing an essential part of the copy machine of FIG. 1 and its control system.

FIG. 1 shows a cross section of a transfer-type color digital copy machine (hereinafter referred to simply as a "copy machine") 1. Further, FIG. 2 shows a schematic structure of an essential part of the copy machine 1 and its control system.

As is shown in FIG. 1, the copy machine 1 includes a scanner section 2 as reading means, and a printer section 4 as image forming means. Further, an automatic document feeder (hereinafter referred to simply as and "ADF") 6 is set on the scanner section 2.

The ADF 6 serves as an openable cover for a document table (which will be described later) incorporated in the scanner section 2, and has a function for feeding documents D onto the document table one by one, a function as a document presser for pressing the document D against the document table.

The printer section 4 has a first through fourth image forming sections 10Y, 10M, 10C and 10K for forming images of yellow (Y), magenta (M)(a kind of red), cyan (C) (a hue between violet and blue) and black (K), respectively.

A conveyance mechanism 20 is provided under each of the image forming sections 10Y, 10M, 10C and 10K for conveying, along the image forming sections, a recording paper sheet P as a medium on which an image is formed. The conveyance mechanism 20 has a conveyance belt 21 for conveying the paper sheet P in a direction indicated by arrow "a", to transfer thereto images of those color components formed by the image forming sections.

As is shown in FIG. 2, the conveyance belt 21 is extended between a driving roller 24 rotated by a belt motor 22 and a driven roller 26 separated from the roller 24 by a predetermined distance, and is made to run endlessly at a constant rate in the direction indicated by arrow "a". The image forming sections 10Y, 10M, 10C and 10K are linearly arranged along the conveyance direction of the conveyance belt 21.

The image forming sections 10Y, 10M, 10C and 10K include photosensitive drums 11Y, 11M, 11C and 11K as image carriers which rotate in one direction in positions (transfer positions) in which they contact the conveyance belt 21, respectively. The photosensitive drums have their rotary shafts connected to drum motors 9Y, 9M, 9C and 9K for rotating the drums at a predetermined rate.

The rotary shafts of the photosensitive drums 11Y, 11M, 11C and 11K are arranged at regular intervals perpendicular to the image conveyance direction of the conveyance belt 21. In the description stated below, the axial direction of each photosensitive drum is termed a main scanning direction (a second direction), while the rotational direction of the drum, i.e. the conveyance direction (indicated by arrow "a") of the conveyance belt 21 is termed a sub-scanning direction (a first direction).

Around each photosensitive drum 11Y, 11M, 11C or 11K, there are provided a charging roller 12Y, 12M, 12C or 12K as charging means, a developing unit 13Y, 13M, 13C or 13K as developing means, a transfer unit 14Y, 14M, 14C or 14K as transfer means, and a cleaning unit 15Y, 15M, 15C or 15K in the order mentioned. Each of these elements extends in the main scanning direction. Further, each transfer unit is opposed to a corresponding photosensitive drum, with the conveyance belt 21 interposed therebetween. In other words, the transfer unit is provided on the inner surface of the conveyance belt 21. An exposure point at which exposure is performed by an exposure unit (which will be described later) appears on the outer surface of the photosensitive drum between the charging roller and the developing unit.

A sheet cassette 30 is located below the conveyance belt 21, which contains a plurality of recording paper sheets P onto each of which images formed by the image forming sections 10Y, 10M, 10C and 10K are transferred.

A pick-up roller 32 is provided at the end of the cassette 30 close to the driven roller 26 for picking up paper sheets P one by one (in the order beginning from the top sheet) from the cassette 30. A resist roller 34 is interposed between the pick-up roller 32 and the driven roller 26 for aligning the front edge of a paper sheet P picked up from the cassette 30 with the front edge of a Y toner image formed on the photosensitive drum 11Y of the first image forming section 10Y. The other photosensitive drums 11M, 11C and 11K are moved so that toner images (M, C, K) formed thereon will reach respective transfer positions in accordance with the timing of the conveyance of the paper sheet P.

An electrostatically holding roller 36 for applying a predetermined electrostatic holding force to the paper sheet P conveyed at a predetermined point of time via the resist roller 34 is provided between the resist roller 34 and the first image forming section 10Y in the vicinity of the driven roller 26, i.e. substantially on the roller 26 with the conveyance belt 21 interposed therebetween. The axes of rotation of the electrostatically holding roller 36 and the driven roller 26 are parallel to each other.

A sensor 38 (which will be described later) for sensing the position of an image formed on the conveyance belt 21 is provided above the driving roller 24 at a predetermined distance therefrom, with the conveyance belt 21 interposed therebetween. The sensor 38 is formed of a transmission type or reflection type optical sensor.

A belt cleaner 40 is provided on the driving roller 24 downstream of the sensor 38 for cleaning toner (including a pattern 109 for sensing which will be described layer) or paper dust stuck to the conveyance belt 21.

A fixing unit 50 is provided in a direction in which the paper sheet P conveyed by the conveyance belt 21 and discharged from the driving roller 24 is further moved. The fixing unit 50 heats the paper sheet P to a predetermined temperature to melt toner images transferred thereto and fix them thereon.

The right-side surface of the printer section 4 has a feed port 4a formed therein for manually feeding a recording paper sheet P. A paper feed tray 42 is attached to the right-side surface near the feed port 4a. The paper sheet P fed through the feed port 4a is fed to each image forming section via the resist roller 34. A paper discharge tray 44 is provided on the left-side surface of the printer section 4 for receiving a paper sheet P discharged via the fixing unit 50.

An exposure unit 60 for forming electrostatic latent images of basic color components on the photosensitive drums 11Y, 11M, 11C and 11K, respectively, has laser emission units for respective colors to be controlled on the basis of image data items for respective color components(Y, M, C, K)(which will be described layer) created in the image forming sections. In FIG. 2, only a laser emission unit 104 for black is shown. On the optical path of each laser emission unit, there are provided a polygon mirror 61 for reflecting and scanning a corresponding laser beam, and first through third f θ lenses 62, 63 and 64 located in this order for correcting the focal point of the laser beam reflected by the polygon mirror 61 to form an image.

Between the third f θ lens 64 and each photosensitive drum 11Y, 11M, 11C or 11K, there are provided a first reflection mirror 65 (Y, M, C, K) for reflecting the laser beam of a corresponding color component having passed the third f θ lens 64, and second third reflection mirrors 66 (Y, M, C) and 67 (Y, M, C) for further reflecting the laser beam reflected by the first reflection mirror 65 (Y, M, C), to an exposure portion of the drum. The laser beam of black is directly reflected to the photosensitive drum 11K by the first reflection mirror 65K.

The scanner section 2 for reading an image on a document has a document table 81 of transparent glass opposed to the ADF 6 situated above it when closed, and to be provided with a document D. Below the document table 81, there are provided an exposure lamp 82 for illuminating the document D on the document table 81, a reflector 84 for converging onto the document D light emitted from the exposure lamp 82, and a first mirror 86 for leftwardly (in FIG. 1) reflecting the light reflected from the document D. The exposure lamp 82, the reflector 84 and the first mirror 86 are secured to a first carriage 88, which is connected to a pulse motor (not shown) by means of a toothed belt (not shown), etc. The first carriage 88 is moved parallel to the document table 81 by the driving force of the pulse motor.

A second carriage 90 is provided on the left side of the first carriage 88, i.e. in a direction in which light reflected from the first mirror 86 is guided. The second carriage 90 is arranged parallel to the document table 81 and movable via a driving mechanism such as a DC motor and a toothed belt.

The second carriage 90 includes a second mirror 92 for downwardly reflecting the light reflected from the document D and guided by the first mirror 86, and a third mirror 94 located at right angles to the second mirror 92 for rightwardly (in FIG. 1) reflecting the light reflected from the second mirror 92. The second carrier 90 is disposed to move parallel to the document table 81 in accordance with the movement of the carrier 88 at half the speed of the first carriage 88.

An image forming lens 96 is provided in a plane including the optical axis of the second carriage 90, for converging the light reflected from the carriage 90 with a predetermined magnification. A CCD image sensor 98 is provided in a plane perpendicular to the optical axis of the image forming lens 96, for converting the light converged by the image forming lens 96 to an electric signal, i.e. image data.

When in the above-described structure, light emitted from the exposure lamp 82 is collected onto the document D on the document table 81 by the reflector 84, light reflected from the document D enters the CCD image sensor 98 via the first through third mirrors 86, 92 and 94 and the image forming lens 96, where the light is converted to image data.

The operation of the copy machine 1 constructed as above will now be described in detail.

When a power switch (not shown) is turned on, the copy machine 1 is initialized and set in its stand-by state, in which the fixing unit 50 is heated to a predetermined temperature and each motor is set at a predetermined rotational speed. The scanner section 2 scans the document D, and reads an image on the document D as image data using the CCD image sensor 98. The read image data is once stored in an image memory 101, and then supplied to an image processing unit 102, where it is separated into image data items relating to basic color components (Y, M, C, K). If necessary, each of the image data items are subjected to various image processes such as magnification change, rotation, displacement, etc.

A process for forming an Y (yellow) image by means of the first image forming section 10Y will be described. It is a matter of course that an M (magenta) image, a C (cyan) image and a K (black) image can be formed in a similar process.

First, the surface of the photosensitive drum 11Y is charged by the charging roller 12Y. Subsequently, the laser emission unit 104 is controlled on the basis of the Y (yellow) image data processed by the image processing unit 102, thereby radiating a predetermined exposure portion of the photosensitive drum 11Y with a laser beam based on the Y image data. As a result, a Y electrostatic latent image corresponding to the Y image data is formed on the photosensitive drum 11Y.

The Y electrostatic latent image formed on the photosensitive drum 11Y is developed into a visualized Y toner image by the developing unit 12Y which contains a Y toner.

The Y toner image on the photosensitive drum 11Y is transferred, by the transfer unit 14Y, onto the recording paper sheet P taken out of the paper cassette 30 and timely aligned and held on the conveyance belt 21 by the resist roller 34.

Similarly, in the second through fourth image forming sections 10M, 10C and 10K, M, C and K toner images formed on the photosensitive drums 11M, 11C and 11K are sequentially transferred onto the paper sheet P conveyed by the conveyance belt 21. Thus, in the case of multi-color printing, the image forming cycle of charging, exposure, development and transfer is repeated by the image forming sections 10Y, 10M, 10C and 10K, thereby transferring toner images of different color components onto a single paper sheet P such that they overlap each other.

Since the photosensitive drums 11Y, 11M, 11C and 11K are arranged at regular intervals in the sheet conveyance direction, the laser units of different color components are disposed to perform exposure at different points of time to appropriately overlap the toner image of different color components on the single paper sheet P conveyed by the conveyance belt 21.

The toners remaining on the photosensitive drums 11Y, 11M, 11C and 11K after the transfer is cleaned by the cleaning units 15Y, 15M, 15C and 15K, respectively.

The paper sheet P with the toner images of different color components is shifted from the conveyance belt 21 to the fixing unit 50, where the toner images are heated, melted and fixed on the sheet P. The sheet P is then discharged into the discharge tray 44.

The toners of different colors and paper dust stuck to the conveyance belt 21 are removed by the belt cleaner 40.

Referring then to FIG. 2, descriptions will be given of the manner of controlling the circumferential speed of the photosensitive drums 10Y, 10M, 10C and 10K so as to be equal to the running speed of the conveyance belt 21. Although only the case of controlling the circumferential speed of the photosensitive drum 11K for black toner so as to be equal to the running speed of the conveyance belt 21 will be described below, it is a matter of course that the same can be said of the other photosensitive drums.

First, a drum motor 9K and a belt motor 22 are started to rotate in a direction indicated by the arrows under the control of motor drivers 112 and 114. The motor drivers 112 and 114 control the drum motor 9K and the belt motor 22 to rotate at a predetermined reference rotational speed in order to make the circumferential speed of the photosensitive drum 11K equal to the running speed of the conveyance belt 21.

When each motor starts to rotate, the rotational speed of the drum motor 9K is detected by a rotational speed detector 116 and compared with a predetermined value. The difference between the actual rotational speed of the drum motor 9K and the reference value is calculated and amplified, and a control signal indicative of the amplified difference is output to the motor driver 112. The motor driver 112, in turn, controls the rotational speed of the drum motor 9K on the basis of the control signal to make it equal to the reference value.

On the other hand, the rotational speed of the belt motor 22 is detected by a rotational speed detector 118, and input to a motor rotational target value setting circuit 120 (hereinafter referred to simply as a "setting circuit 120"). The setting circuit 120 compares the input actual rotational speed of the belt motor 22 with a reference value to obtain the difference therebetween. The difference is amplified by an amplifier and a control signal indicative of the amplified difference is output to the motor driver 114. The motor driver 114, in turn, controls the rotational speed of the belt motor 22 on the basis of the control signal to make it equal to the reference value. As a result, the circumferential speed of the photosensitive drum 11K is made equal to the running speed of the conveyance belt 21.

Moreover, where the circumferential speed of the photosensitive drum 11K is controlled be equal to the running speed of the conveyance belt 21, the image processing unit 102 generates a time constant indicative of a predetermined time interval based on a clock signal output from a clock counter 106, and reads prestored speed control patterns from an image memory 101. Thus, speed control patterns arranged at a pitch based on the time constant are prepared by the image processing unit 102. Each speed control pattern appears, on the photosensitive drum 11K or the conveyance belt 21, to comprise a plurality of line segments with a predetermined length which extend in the main scanning direction and are separated from each other at regular intervals in the sub-scanning direction.

Figure 3:
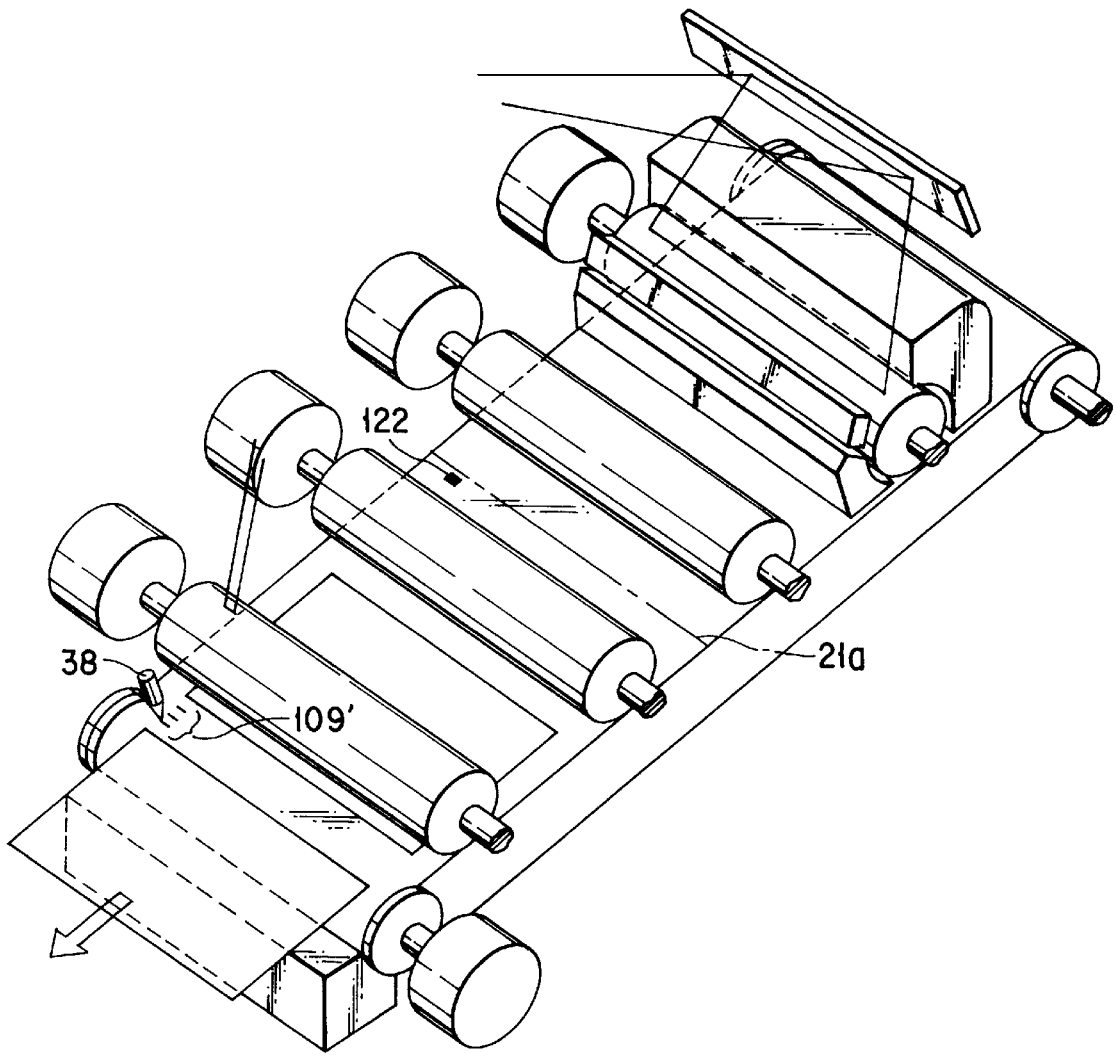
FIG. 3 is a view, showing a state in which a pattern is formed between sheets of paper.

A laser beam corresponding to the speed control pattern is applied to a predetermined exposure portion of the photosensitive drum 11K via the exposure unit 60, thereby forming an electrostatic latent image 108 corresponding to the speed control pattern is formed on the photosensitive drum 11K. The portion of the drum 11K on which the electrostatic latent image 108 is formed corresponds to the portion of the conveyance belt 21 in which the recording paper sheet P is not placed when the latent image is transferred thereto. In other words, that portion is a width-directionally marginal portion of the conveyance belt 21. Alternatively, a pattern for sensing is formed on the portion of the conveyance belt 21 which is positioned between adjacent paper sheets P sequentially conveyed, as is shown in FIG. 3.

The electrostatic latent image 108 formed on the photosensitive drum 11K is developed by the developing unit 13K, and then transferred onto the conveyance belt 21 by the transfer unit 14K, thereby forming a pattern image 109 for sensing (which will hereinafter be referred to as a "sensing pattern" 109) on the conveyance belt 21. The sensing pattern 109 moves with the conveyance belt 21, and is erased by the belt cleaner 40. The sensing pattern 109 is sensed as a pulse signal of a predetermined pitch by the sensor 38 located upstream of the belt cleaner 40. The sensor 38, in turn, generates an electric signal indicative of the sensed pattern or pulse signal. In other words, each time the sensing pattern 109 is sensed by the sensor 38, it is erased and rewritten.

The pulse signal generated from the sensor 38 is compared with the time constant created by the image processing unit 102, and the difference therebetween is output as a belt speed error to the setting circuit 120. The setting circuit 120 corrects, on the basis of the belt speed error, the preset reference rotational speed of the belt motor 22, thereby setting a new reference value. On the basis of the newly set reference value, the rotational speed of the belt motor 22 is controlled.

Since as described above, the image pattern actually formed on the conveyance belt 21 is detected, and the reference rotational speed of the belt motor 22 is corrected on the basis of the detected pattern, a change in the running speed of the conveyance belt 21 due to expansion of the belt, change of the diameter of the driving roller 24, etc. can be corrected each time the speed change is found, thereby preventing sub-scanning directional displacement of an image due to the speed change.

It is considered that the expansion of the conveyance belt 21 and the change of the diameter of the driving roller 24 may result from their thermal expansion due to the heat generated by the fixing unit 50 located in the vicinity of the driving roller 24. The speed change of the conveyance belt 21 with lapse of time, however, will be relatively small. Therefore, the sensing pattern 109 formed on the belt 21, which consists of line segments continuously arranged as shown in FIG. 2, may be replaced with a sensing pattern 109' as shown in FIG. 3, whose line segments are arranged such that groups each consisting of a few line segments are formed at regular intervals on the conveyance belt 21.

Furthermore, the sensor 38 for sensing the sensing pattern 109 (109') may be also used to sense a seam 21a on the conveyance belt 21 as shown in FIG. 3. In this case, there is provided a mark 122 for seam sensing which has a wider sub-scanning directional width than the sensing pattern 109, and sensing signals are filtered to discriminate the mark 122 and the sensing pattern 109 from each other. Thus, the single sensor 38 can sense both the seam 21a and the sensing pattern 109 on the conveyance belt 21.

A method for detecting and correcting a blurred state of a color image formed by the image forming sections 10Y, 10M, 10C and 10K of the copy machine 1 will be described in detail.

First, where the rotation of the photosensitive drums 11Y, 11M, 11C and 11K and the conveyance belt 21 are stabilized, the image processing unit (correction means) 102 creates a time constant having a predetermined time interval based on a reference clock signal generated from the clock counter 106. Then, the image processing unit 102 reads image data prestored in the image memory (storage means) 101 and indicative of patterns for detecting a blurred state (which will be hereinafter referred to simply as "patterns" or "sensing pattern" and described in detail later), thereby forming on the photosensitive drums electrostatic latent images of different color patterns arranged at a pitch corresponding to the time constant.

Figure 4:
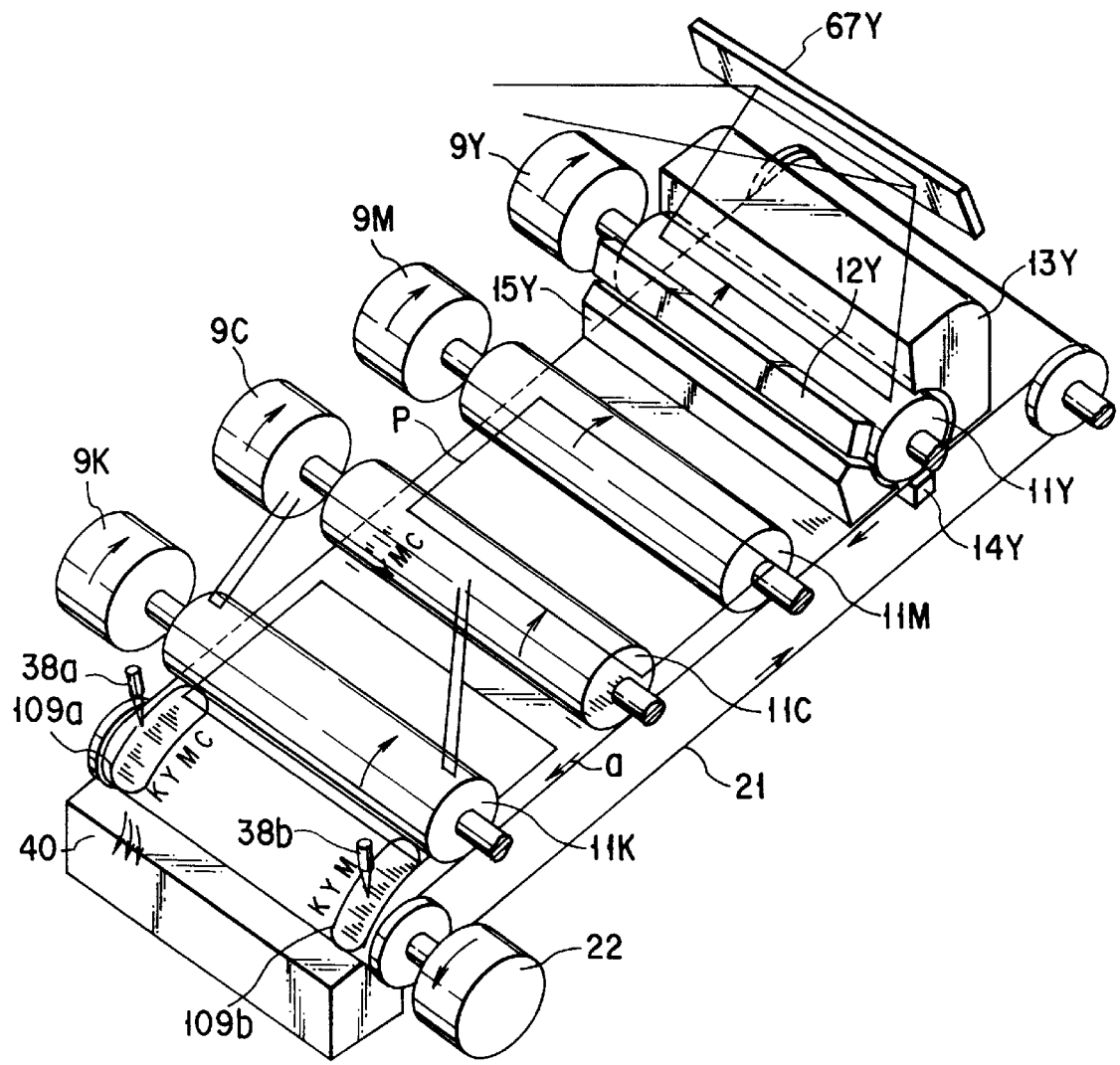
FIG. 4 is a perspective view, showing an essential part of the copy machine, on which patterns of a first embodiment of the invention are transferred onto a conveyance belt incorporated in the machine.

The electrostatic latent images of the pattern components of each pattern on the photosensitive drums are developed by different color (K, Y, M, C) toners and transferred onto the conveyance belt 21. As is shown in FIG. 4, the toner images of the different color pattern components are formed at different points of time so that they will be arranged at regular intervals in the sub-scanning direction on the conveyance belt 21. The color patterns are formed on both opposite main-scanning directional end portions (i.e. both opposite edge portions) of the belt 21 with a predetermined distance therebetween, i.e. on the rear side and the front side of the copy machine 1. In other words, the color patterns are formed on those opposite main-scanning directionally outside portions of the conveyance belt 21, on which the paper sheets P are not placed.

Moreover, a pair of sensors 38a and 38b as sensing means are provided, with a predetermined main-scanning directional distance therebetween, above the portions of the conveyance belt 21 on which the patterns 109 and 109' are formed in FIG. 4, to sense pairs of patterns formed on the belt 21 with a main-scanning directional distance therebetween. The sensors 38a and 38b are parallel to each other in the main-scanning direction.

Figure 5:
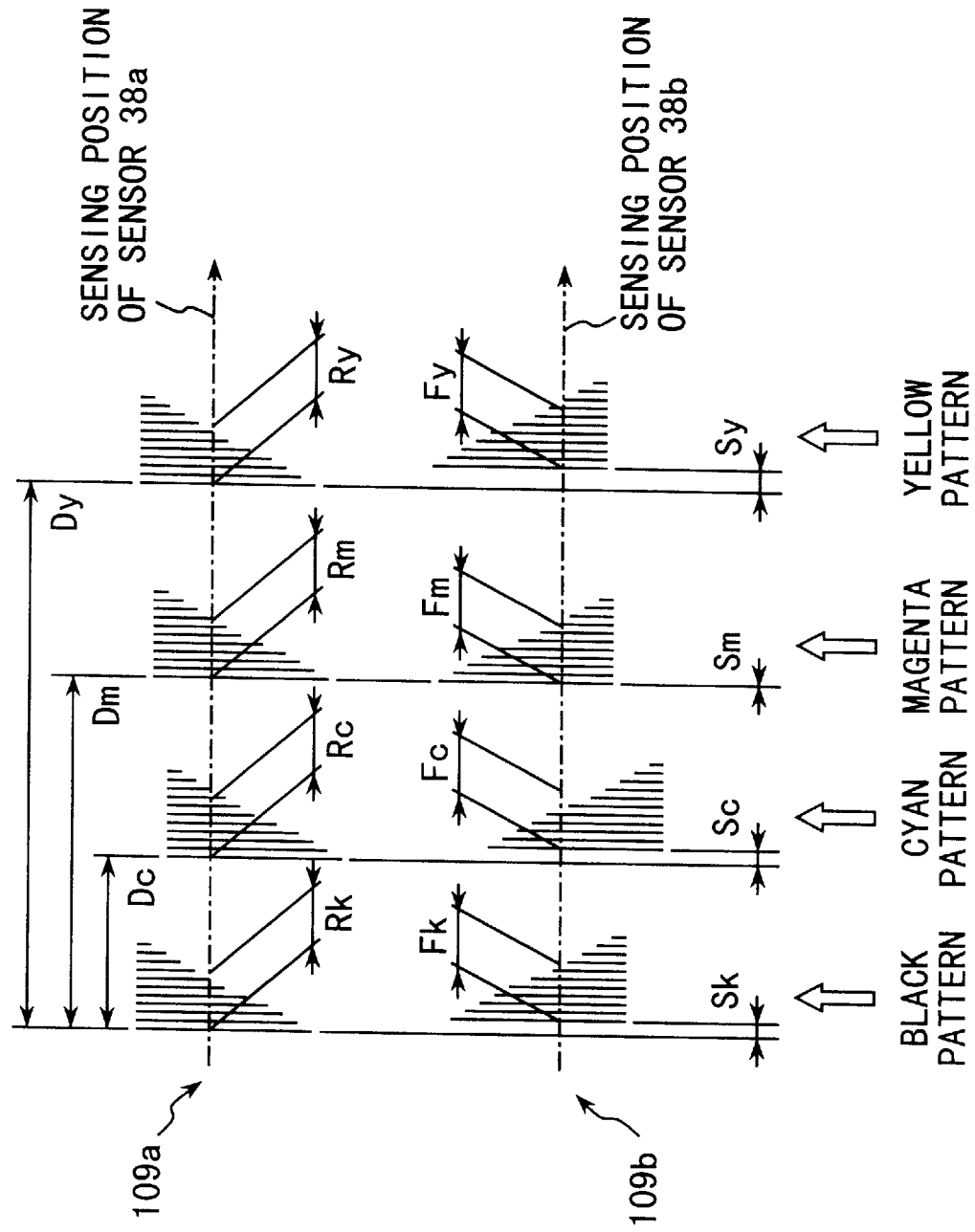
FIG. 5 is an enlarged view, showing the patterns of FIG. 4.

Referring then to FIG. 5, color patterns formed on the conveyance belt 21 and according to a first embodiment of the invention will be described. In FIG. 5, patterns 109a and 109b to be formed on the conveyance belt 21 with a predetermined main-scanning directional distance therebetween are located adjacent to each other for facilitating the explanations thereof. Four pairs of color pattern components (Y, M, C, K) are repeatedly formed on the conveyance belt 21 at a pitch corresponding to the time constant, as is shown in FIG. 7A. For example, these color pattern components are formed between each pair of adjacent paper sheets P continuously conveyed.

Each color pattern component of the pattern 109a or 109b includes a plurality of line segments of different lengths which extend in the main-scanning direction and are arranged parallel to each other at regular intervals in the sub-scanning direction. In the pattern 109a formed on that portion of the conveyance belt 21 which is located on the rear side of the copy machine 1, the rear-side ends (i.e. the ends close to one main-scanning directional end of the conveyance belt 21) of the line segments are arranged in line in the sub-scanning direction. Further, the line segments of each pattern component of the pattern 109a have lengths gradually shortened from the leftmost one to the rightmost one (in FIG. 5). In other words, the front-side ends of the line segments, which are remote from the main-scanning directional end of the belt 21, are located along an oblique transverse line with respect to the pattern sensing direction (sub-scanning direction) of the sensor 38a. Each pattern component of the other pattern 109b formed on the conveyance belt 21 at the front side of the copy machine 1, and each pattern component of the pattern 109b are symmetrical with respect to the sub-scanning direction.

Figure 6A:
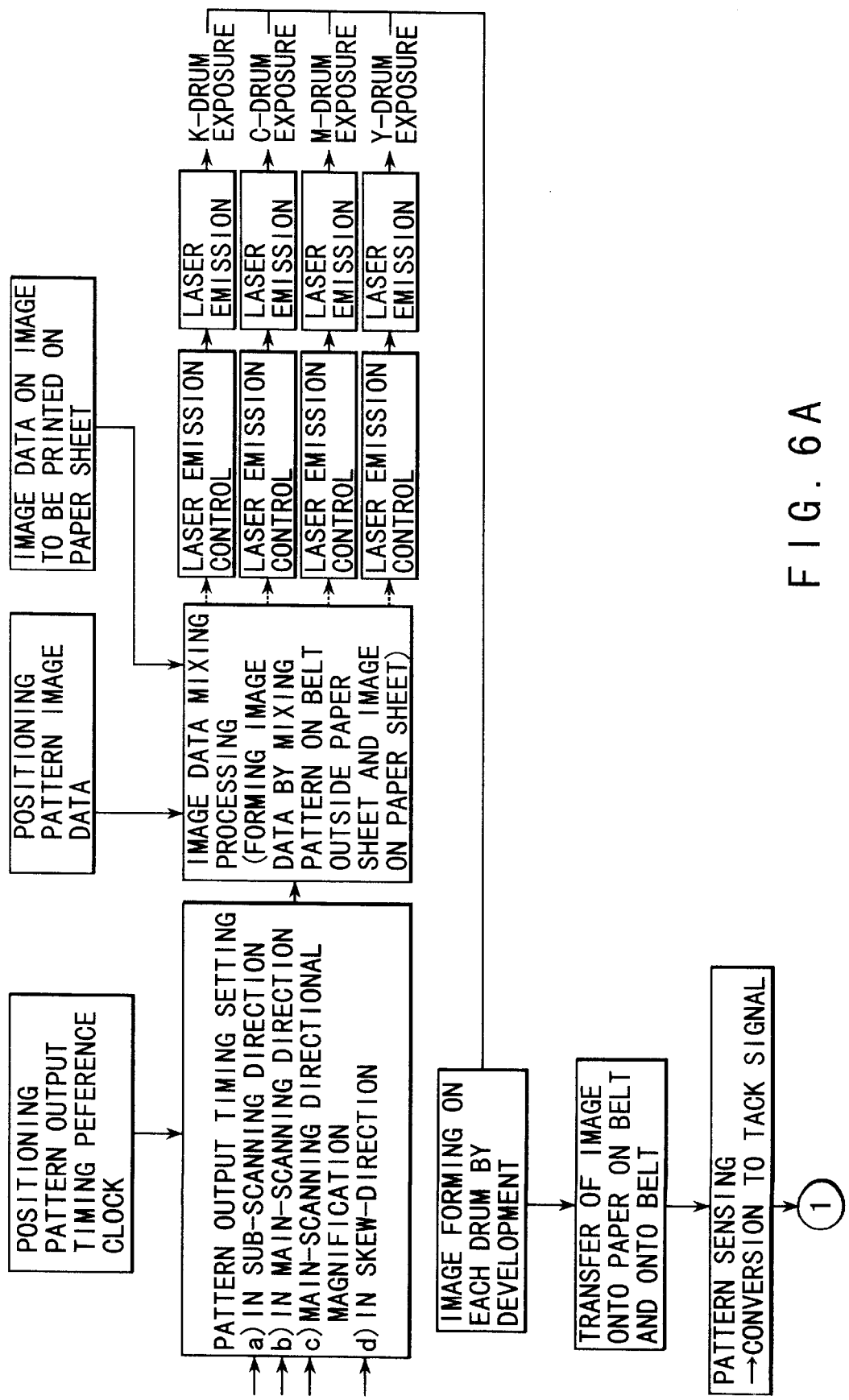
FIGS. 6A and 6B are views, useful in explaining how to correct a blurred image using the pattern of FIG. 4.
Figure 6B:
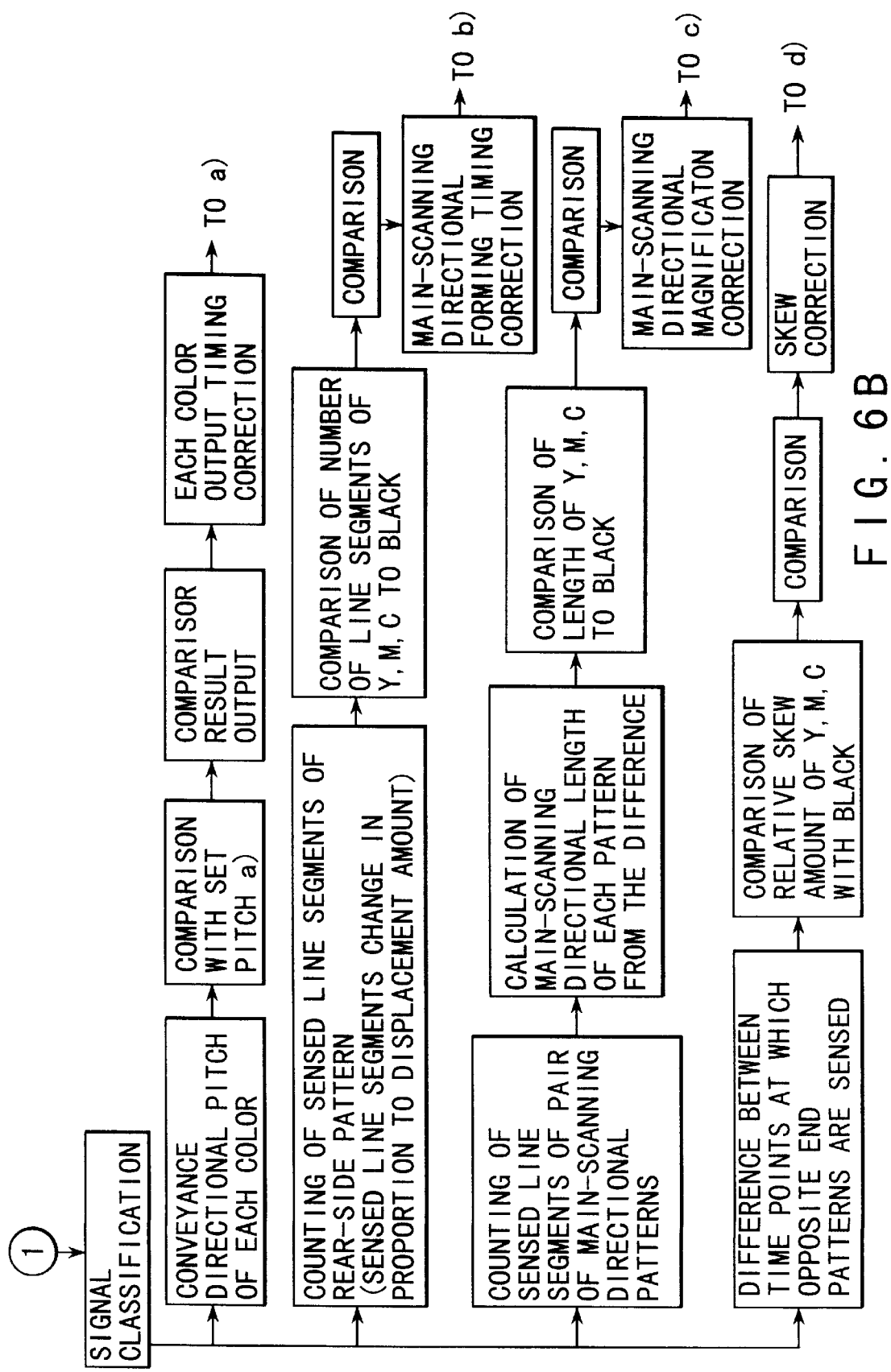

Referring to FIGS. 6A and 6B, a method for correcting a displaced color image formed on the conveyance belt 21 using the patterns 109a and 109b will be described.

First, the image processing unit 102 reads, from the image memory 101, image data items concerning the patterns 109a and 109b, as well as image data concerning an image to be printed on a paper sheet P. The processing unit 102 then separates image data on the image to be printed on the sheet, into image data items corresponding to different color components (Y, M, C, K), and if necessary, processes the image data items so as to deform, magnify or minificate images corresponding thereto, thereby synthesizing each pattern data item and a corresponding image data item.

The image processing unit 102 creates a time constant based on a reference clock, and synthesizes each of all pattern data items with a pitch corresponding to the time constant, and a corresponding one of all image data items. At this time, each image data item and a corresponding pattern data item are synthesized at the timing which enables four color toner images corresponding to the image data items to accurately overlap each other on a paper sheet P conveyed by the conveyance belt 21, and simultaneously enables four color toner images corresponding to the pattern data items to be displaced from each other at regular intervals on the conveyance belt 21, as is shown in FIG. 5.

Accordingly, to accurately overlap, on the paper sheet P, the toner images corresponding to all the image data items, it suffices if the image forming portions of the image forming sections 10Y, 10M, 10C and 10K are adjusted so as to correct relative displacement of each toner image or pattern component corresponding to each pattern data item. Relative displacements of the pattern components are sensed only by the sensors 38a and 38b. More specifically, relative displacements of each pattern component (a) in the sub-scanning direction, (b) in the main-scanning direction and (d) in a skew direction are sensed. Further, relative displacement of the pattern component resulting from (c) a change in the main-scanning directional magnification is sensed. When the image processing unit 102 synthesizes the image data items and the pattern data items, it considers the optimal positions of each color pattern component and a corresponding image component, which relate to the above-mentioned items (a)–(d).

Once all color pattern components are set, all color laser beams are emitted from all color laser units on the basis of all color image data items and pattern data items, thereby exposing the photosensitive drums 11Y, 11M, 11C and 11K. As a result, electrostatic latent images corresponding to the image data items and the pattern data items for detecting the image forming position of each color image are formed on the photosensitive drums.

The electrostatic latent images on the photosensitive drums are developed by the developing units 13Y, 13M, 13C and 13K into toner images of different color components. These toner images are sequentially transferred onto the paper sheet P and the conveyance belt 21 in their transfer positions. In other words, the toner images to be printed on the paper sheet P are transferred onto the sheet P in an overlapping manner, and the toner images corresponding to the pattern data items are transferred onto those portions of the conveyance belt 21 which are located outside the paper sheet P along the edges of the belt.

The paper sheet P with the overlapping toner images is moved from the conveyance belt 21 to the fixing unit 50, where the toners are heated, melted and fixed on the paper sheet P. Then, the paper sheet P with a fixed color image is discharged into the discharge tray 44.

On the other hand, the color patterns 109a and 109b formed on the conveyance belt 21 are moved in accordance with the running of the belt, and sensed by the sensors 38a and 38b opposed to each other. The color patterns sensed by the sensors 38a, 38b are removed by the belt cleaner 40, and new patterns are sequentially formed on the conveyance belt 21.

The color patterns 109a and 109b sensed by the sensors 38a and 38b are converted into pulse signals and processed in a manner described below.

For example, the point of time at which the first line segment (the longest line segment) of each pattern component of the pattern 109a located on the rear side of the copy machine 1 passes the sensor 38a is sensed by the sensor, thereby calculating the distance or pitch Dc, Dm and Dy between the first line segment of the black pattern and the first line segment of each of the other color patterns. Thereafter, these calculated pitches Dc, Dm and Dy are compared with respective predetermined values set at the time of synthesizing the pattern data items and the image data items. On the basis of the comparison results, the sub-scanning directional position (a) of each pattern component is corrected so that the first line segments of the pattern components will be arranged at regular intervals.

The number Rk, Rc, Rm or Ry of line segments included in each pattern component of the pattern 109a and sensed by the sensor 38a is counted, and the difference between the number Rk of the sensed line segments of the black pattern component and the number Rc, Rm or Ry of the sensed line segments of another pattern component is determined. Then, the main-scanning directional position (b) of each pattern component is corrected so that each of the numbers Rc, Rm and Rk of the line segments will be equal to the number Rk.

In other words, the remoter from the main-scanning directional end of the conveyance belt 21 the pattern component is, the larger the number of the sensed line segments of each pattern component is. On the other hand, the closer to the main-scanning directional end of the conveyance belt 21 the pattern component is, the smaller the number of the sensed line segments of each pattern component is. Accordingly, the main-scanning directional positions (b) of all the pattern components can be made to coincide by adjusting the positions of the pattern components so that the numbers of the sensed line segments will be equal to each other.

In addition to the counting of the numbers Rk, Rc, Rm and Rk of the sensed line segments of the pattern components of the pattern 109a located on the rear side of the machine 1, the numbers Fk, Fc, Fm and Fy of the sensed line segments of the pattern components of the pattern 109b located on the front side of the machine 1 are counted, thereby calculating the differences (Fk–Rk), (Fc–Rc), (Fm–Rm) and (Fy–Ry).

Thereafter, the main-scanning directional distance between each pair of corresponding pattern components is calculated from the differences, and the main-scanning directional distance between the black pattern components is compared with that between each pair of the other pattern components. Then, the main-scanning directional magnification (c) of each pair of pattern components other than the black pattern components is adjusted so that the main-scanning directional distance between each pair of the other pattern components will coincide with that between the black pattern components.

Moreover, the time point at which the first line segment of each pattern component of the pattern located on each of the rear and front sides passes the sensor is sensed, thereby calculating the amount of error in the time point of sensing of each pattern component, i.e. the amount of skew Sk, Sc, Sm or Sy. Then, the skew amount of each pair of the color pattern components other than the black components is compared with the skew amount Sk of the black pattern components, and the skew amount (d) of each pair of the pattern components is corrected so that it will be equal to the skew amount of the black pattern components.

Thus, an image to be printed on the paper sheet P can be kept free from a displaced state by correcting relative displacement of each color pattern component formed on the conveyance belt 21 concerning the above-mentioned items (a)–(d).

In particular, correcting the displacement of an image using the patterns employed in this embodiment enables highly accurate correction of a main-scanning directional displacement of the image, as compared with the case of using the conventional wedge patterns. As described above, in the embodiment, the line segments of each pattern component which moves in the sub-scanning direction are counted, and compared with the number of the line segments of a reference color pattern component (e.g. a black pattern component), thereby correcting the main-scanning directional displacement of each pattern component so that the number of the line segments of it will be equal to that of the black pattern component. As a result, the main-scanning directional displacement of each pattern component can be grasped digitally, which means that the displacement can be corrected with higher accuracy than ever.

Thus, in the embodiment, images of different color components can be made to overlap each other more accurately than in the conventional case, thereby enabling reliable prevention of a displaced image and printing of a high quality image on a paper sheet P.

In addition, since in the embodiment, the color patterns are sensed by optical sensors 38a, 38b, any expensive device such as a CCD sensor employed in the conventional case is not necessary, and hence the image forming apparatus of the invention can be manufactured at a relatively low cost.

Referring then to FIGS. 7B and 7C, patterns according to second and third embodiments of the invention will be described. These patterns are formed in the same manner including timing as in the first embodiment shown in FIG. 7A.

As is shown in FIG. 7B, patterns 130a and 130b according to the second embodiment are each formed of four pairs of color pattern components arranged in the sub-scanning direction. Each of the color pattern components has a first line segment which is based on a time constant as in the case of the patterns 109a and 109b of the first embodiment, and extends in the main-scanning direction. The color pattern component further has a plurality of second line segments which obliquely extend from the first line segment parallel to each other at regular intervals. More specifically, the second line segments incline from the first line segment toward the edge of the conveyance belt 21 (at an angle of, for example, 45°), and have the ends remote from the first line segment arranged in line in the sub-scanning direction. Like the patterns 109a and 109b of the first embodiment, the pattern components of the patterns 130a and 130b are formed on the conveyance belt 21 in the vicinity of its opposite edges, and symmetrical with respect to the sub-scanning direction.

The color patterns formed as above are sensed by sensors 38a and 38b, and the sensing time point of the first line segment of each color pattern component of the patterns is compared with a set value, thereby correcting the sub-scanning directional and skew directional displacements of the pattern component. Further, the sensed second line segments of each pattern component are counted, and the main-scanning directional displacement and magnification of each pattern component are corrected so that all pattern components will have the same number of sensed line segments. Thus, the patterns of the second embodiment can reliably prevent forming of a displaced image and provide a high quality image as in the first embodiment.

Referring to FIG. 7C, patterns 140a and 140b according to the third embodiment are each formed of four pairs of color pattern components arranged in the sub-scanning direction. Each color pattern component has a plurality of line segments of the same length which extend parallel to each other at regular intervals in the main-scanning direction. Further, each color pattern component has a plurality of dots each provided between each pair of adjacent line segments such that the further left (in FIG. 7C) the dot is, the closer to the edge of the conveyance belt 21 the dot is. In other words, the dots are linearly arranged in a direction which obliquely crosses the sub-scanning direction. Those pattern components are formed on the conveyance belt 21 in the vicinity of the opposite edges thereof, and symmetrical with respect to the sub-scanning direction.

When the color patterns 140a and 140b are sensed by sensors 38a and 38b, the sensing time point of the leftmost (in FIG. 7C) line segment of each color pattern component of the patterns 140a and 140b is compared with a set value, thereby correcting the sub-scanning directional and skew directional displacements of the pattern component. Further, those line segments of each color pattern component which are sensed by the time when any dot included in the pattern component is sensed are counted, and the main-scanning directional displacement and magnification of each pattern component are corrected so that all pattern components will have the same number of sensed line segments. It can be judged that the greater the number of line segments sensed until the dot is sensed, the closer to the edge of the conveyance belt 21 the pattern component, and that the smaller the number of sensed line segments, the remoter from the edge of the belt 21 the pattern component. Thus, the main-scanning directional displacement of the pattern component can be determined by the comparison of the sensed line segments. Thus, the patterns of the third embodiment can reliably prevent forming of a displaced image and provide a high quality image as in the first and second embodiments.

Figure 8:
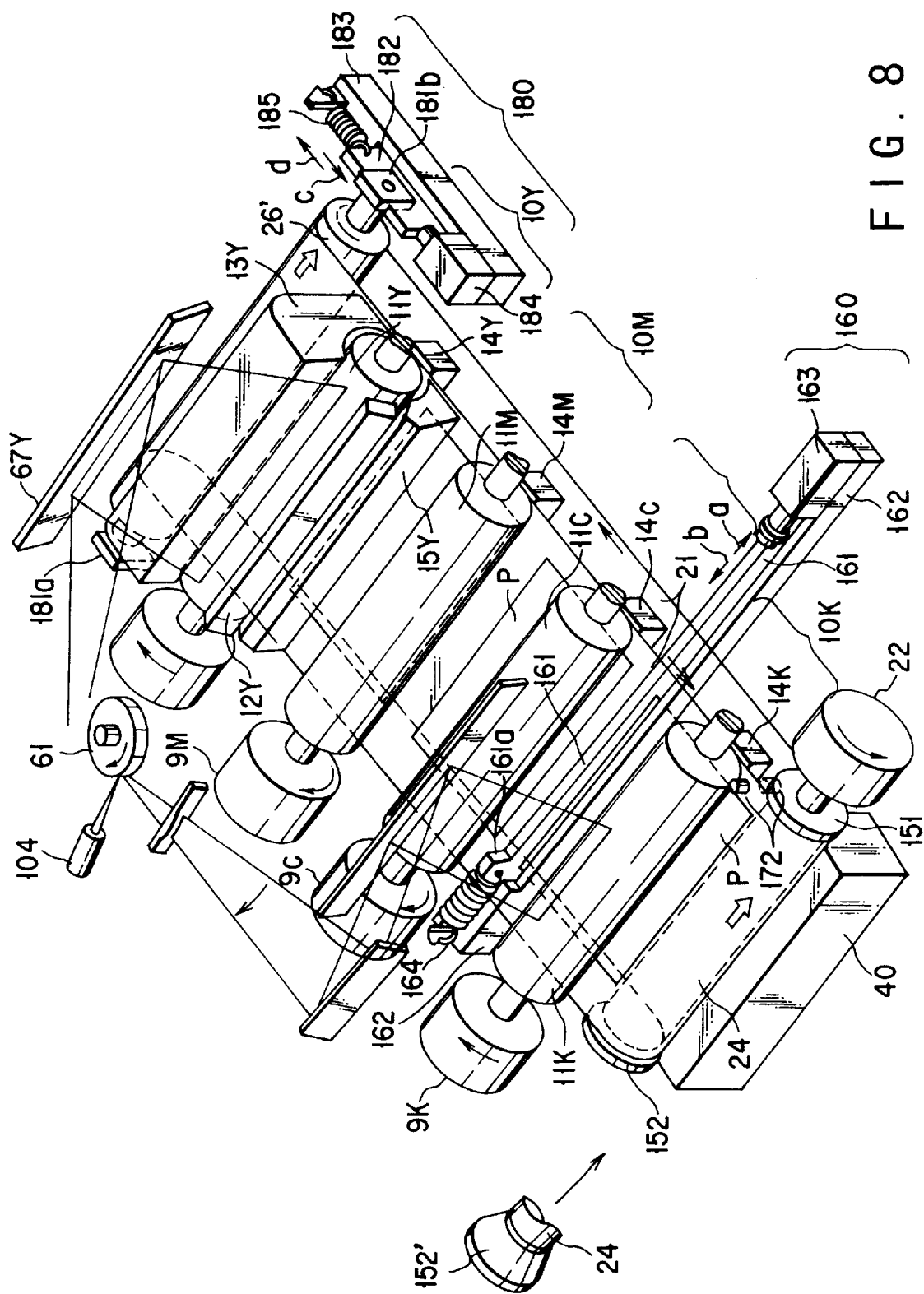
FIG. 8 is a schematic view, showing a mechanism for correcting the position of the conveyance belt.
Figure 9:
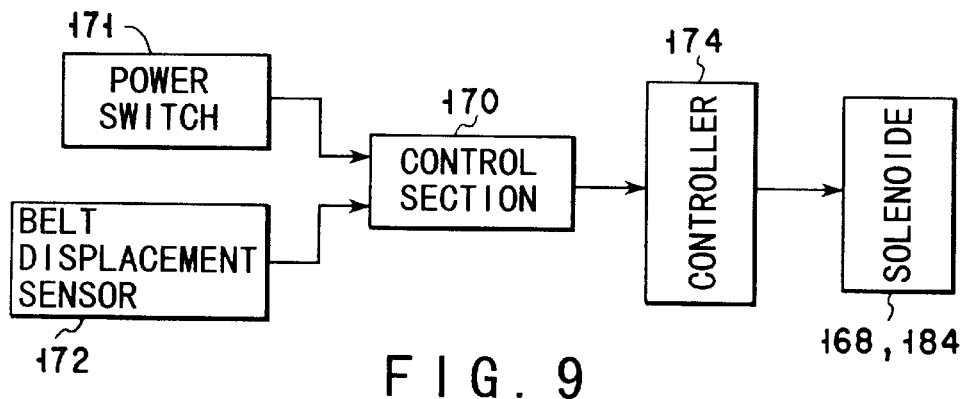
FIG. 9 is a block diagram, showing a control system for controlling the operation of the mechanism of FIG. 8.
Figure 10:
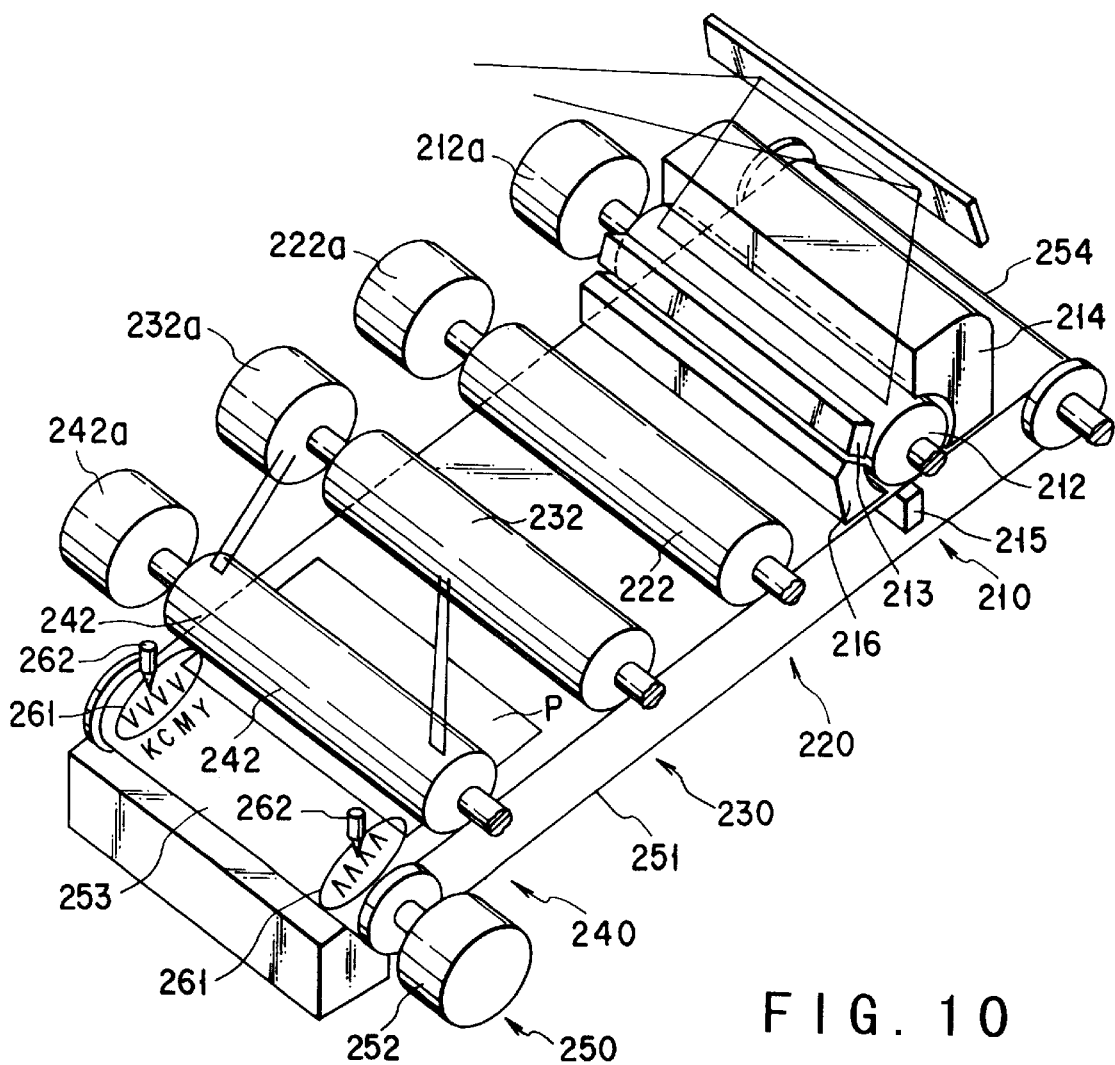
FIG. 10 is a view, useful in explaining the conventional blur correcting method.

Referring then to FIGS. 8 and 9, a method for correcting the displacement of the conveyance belt 21 will be described.

The conveyance belt 21 is extended between the driving roller 24 rotated by the belt motor 22 and the driven roller 26 separated from the roller 24 by a predetermined distance. Therefore, if the copy machine 1 receives a shock when inspecting the machine for maintenance, exchanging a component part of the machine with a new one, or moving the machine itself, it is possible that the conveyance belt 21 is displaced from its predetermined or regular conveyance position in the axial direction of the rollers 24 and 26. Where the conveyance belt 21 is displaced from the regular conveyance position, images of different color components cannot accurately be made overlap each other on the conveyance belt 21, resulting in a degraded or displaced color image.

An apparatus for avoiding the above is well known, which employs a tapered roller 26' formed by gradually tapering the driven roller 26 toward the front side of the copy machine 1, a regulation plate 151 located at the front-side end of the driving roller 24 for prohibiting the movement of the conveyance belt 21, and an auxiliary regulation plate 152 located at the rear-side end of the belt 21 for preventing the belt 21 from coming off the roller 24.

Even when in this structure, the conveyance belt 21 is displaced from the regular conveyance position, it is returned thereto during running while the copy machine 1 performs, after switched on, a warming-up operation such as heating of the fixing unit 50 to a predetermined temperature, or driving of each motor to a predetermined rotational speed.

However, since in the above-mentioned structure, a relatively great amount of time is required to return the conveyance belt 21 to the regular conveyance position, a degraded image such as a displaced image may well be formed by the time when the conveyance belt 21 is returned to the regular conveyance position.

To avoid this, it is considered to increase the taper degree of the tapered roller 26' in order to increase the returning speed of the conveyance belt 21. This may cause, however, fatigue buckling of the belt or fatigue wear of an end face of the belt, although it enables prompt return of the belt to the predetermined position.

In light of the above, the embodiment employs an enforcement mechanism (enforcement means) for promptly returning the conveyance belt to its regular conveyance position without increasing the taper degree of the tapered roller 26'.

An enforcement mechanism 160 employed in the embodiment comprises a slider 161 provided close to the lower surface of the conveyance belt 21 and extending in the main-scanning direction, i.e. in a direction perpendicular to the conveyance direction, a frame 162 for supporting the slider 161 such that it can slide in the main-scanning direction, a solenoid 163 for moving the slider 161 in a direction indicated by arrow a, and a spring 164 urging the slider 161 in a direction indicated by arrow b (to the rear side of the copy machine 1).

The slider 161 has an enforcement face 161a positioned slightly away from the rear-side end of the conveyance belt 21 when the slider 161 is set in its initial position by the urging force of the spring 164. When the solenoid 163 moves the slider 161 in the direction indicated by arrow a, the enforcement face 161a urges the rear-side end of the conveyance belt 21 in the direction indicated by the arrow a to forcibly shift the belt 21 to the regular conveyance position on the front-side of the machine.

FIG. 9 is a block diagram, showing a control system for controlling the operation of the enforcement mechanism 160. The control system for the enforcement mechanism 160 has a control section 170 as control means. The control section 170 is connected to a power switch 171 for the copy machine 1, and to a belt displacement sensor 172 (sensing means) for sensing the displacement of the conveyance belt 21 from the regular conveyance position. As is shown in FIG. 8, the sensor 172 is provided in the vicinity of a front-side end of the conveyance belt 21. The sensor 172 turns on when the conveyance belt 21 moves toward the rear-side of the machine by a degree which exceeds a predetermined allowable range, and turns off when the conveyance belt 21 returns to the regular conveyance position. The control section 170 is further connected to a controller 174 for operating the solenoid 163.

The point of time at which the enforcement mechanism 160 is used is considered to be, for example, where the power switch 171 of the copy machine 1 is turned on, or where the conveyance belt 21 is displaced by a degree which exceeds the allowable range. When the power switch 171 is turned on, or the sensor 172 detects that the displacement of the conveyance belt 21 exceeds the allowable range, the controller 174 turns on the solenoid 163 under the control of the control section 170.

Then, the slider 161 moves along the frame 162 in the direction indicated by arrow a, thereby urging the enforcement face 161a against the rear-side end of the conveyance belt 21 to shift the belt toward the front side of the machine 1. Thus, the conveyance belt 21 is forcibly and promptly shifted to the regular conveyance position. This means that the time required to move the conveyance belt 21 to the regular conveyance position is very short, and therefore forming of a degraded image such as a displaced image can be minimized.

The enforcement mechanism 160 has an urging force while the solenoid 163 is turned on. When the sensor 172 detects the end of the conveyance belt 21 and determines that the belt has been returned to the regular conveyance position, the solenoid 163 is turned off and accordingly the urging force of the enforcement mechanism 160 disappears. After the solenoid 163 is turned off, the slider 161 is returned to its initial position by the restoring force of the spring 164, and the enforcement face 161a is separated from the conveyance belt 21.

An enforcement mechanism 180 according to another embodiment is provided on the rotary shaft of the tapered roller 26', and comprises bearings 181a and 181b provided on both opposite ends of the rotary shaft of the tapered roller 26', a slider 182 holding the front-side bearing 181b, a frame 183 holding the slider 182 such that it can slide in the sub-scanning direction, a solenoid 184 for moving the slider 182 along the frame 183 in a direction indicated by arrow c, and a spring 185 urging the slider 182 in a direction indicated by arrow d.

Since the enforcement mechanism 180 swings the tapered roller 26' in a manner described below, the bearings 181a and 181b holding the opposite ends of the rotary shaft of the tapered roller 26' are formed of self-aligning bearings capable of varying the holding angle of the shaft.

Like the enforcement mechanism 160, the enforcement mechanism 180 of this embodiment is controlled by the control section 170. Specifically, when the power switch 171 of the copy machine 1 is turned on, or the sensor 172 detects the displacement of the conveyance belt 21, the solenoid 184 is turned on.

When the solenoid 184 is turned on, the slider 182 slides in the direction indicated by arrow c, and the front-side bearing 181b moves toward the driving roller 24, thereby swinging the rotary shaft of the tapered roller 26' about the rear-side bearing 181a. Then, the force of the tapered roller 26' for returning the conveyance belt 21 to the regular conveyance position increases, with the result that the belt 21 is returned to the position forcibly and promptly. Thus, the time required to return the conveyance belt 21 to the regular conveyance position is very short, and therefore a degraded image such as a displaced image formed by the time when the belt is returned to the position can be minimized.

The occasions in which the forces of the enforcement mechanisms 160 and 180 according to the above-described embodiments are applied to the conveyance belt 21 can be reduced to thereby elongate the life of the conveyance belt 21 due to fatigue, by providing, on the rear-side end of the driving roller 24, an auxiliary mechanism as described below for correcting the displacement of the conveyance belt 21, as well as the enforcement mechanisms 160 and 180.

The auxiliary mechanism has an auxiliary regulation member 152' having a tapered portion tapered toward the front-side of the machine 1, in place of the auxiliary regulation plate 152 provided on the rear-side end of the driving roller 24. The auxiliary regulation member 152' is disposed such that the end of the conveyance belt 21 contacts the minimum diameter end of the tapered portion when the belt is in the regular conveyance position, and runs onto the tapered portion when the belt 21 is out of the regular conveyance position.

Accordingly, when the conveyance belt 21 is displaced from the regular conveyance position, and the rear-side end of the belt 21 runs onto the tapered portion of the auxiliary regulation member 152', the belt 21 automatically returns to the regular conveyance position in accordance with the running of the belt 21, while the enforcement mechanisms 160 and 180 do not operate. This meant that the occasions of operating the enforcement mechanisms 160 and 180 are reduced.

The invention is not limited to the above-described embodiments, but may be modified in various manners without departing its scope. For example, it may be modified such that a motor is used, in place of the solenoid, as an actuator for operating the enforcement mechanism to forcibly return the conveyance belt to its regular conveyance position, and the driving force of the motor is transmitted through a gear and a lack. Furthermore, it is a matter of course that the above-described mechanism for detecting line segment patterns may be combined with the enforcement mechanism for forcibly returning the belt to the regular conveyance position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. An image forming apparatus for forming an image having a plurality of images overlapped in order, comprising:

conveyance means for supporting and conveying the plurality of images in a first direction;

storage means storing first and second pattern data for outputting, onto the conveyance means, first and second pattern images which each have a plurality of line segments extending substantially parallel to each other in a direction perpendicular to the first direction;

first image forming means for forming, on the conveyance means, a first image, and the first pattern image based on the first pattern data stored in the storage means;

second image forming means for forming, on the conveyance means, a second image, and the second pattern image based on the second pattern data stored in the storage means and the second image being output such that it overlaps the first image, the second pattern image being output such that it is located adjacent to the first pattern image in the first direction;

sensing means provided in a position opposed to the conveyance means for sequentially sensing the first and second pattern images which are formed on the conveyance means; and correction means for comparing the numbers of those line segments of the first and second pattern images sensed by the sensing means, and correcting the positions of the first and second images to be formed by the first and second image forming means, on the basis of the comparison result, wherein the first and second pattern images output onto the conveyance means each include the plurality of line segments, which extend parallel to each other in the second direction perpendicular to the first direction, have their ends linearly arranged at regular intervals in the first direction, and have their lengths shortened in units of a predetermined amount in the first direction.

2. An image forming apparatus for forming an image having a plurality of images overlapped in order, comprising:

conveyance means for supporting and conveying the plurality of images in a first direction;

storage means storing first and second pattern data for outputting, onto the conveyance means, first and second pattern images which each have a plurality of line segments extending substantially parallel to each other in a direction perpendicular to the first direction;

first image forming means for forming, on the conveyance means, a first image, and the first pattern image based on the first pattern data stored in the storage means;

second image forming means for forming, on the conveyance means, a second image, and the second pattern image based on the second pattern data stored in the storage means and the second image being output such that it overlaps the first image, the second pattern image being output such that it is located adjacent to the first pattern image in the first direction;

sensing means provided in a position opposed to the conveyance means for sequentially sensing the first and second pattern images which are formed on the conveyance means; and correction means for comparing the numbers of those line segments of the first and second pattern images sensed by the sensing means, and correcting the positions of the first and second images to be formed by the first and second image forming means, on the basis of the comparison result, wherein the first and second pattern images output onto the conveyance means each include a first line segment extending in the second direction perpendicular to the first direction, and a plurality of second line segments obliquely extending from the first line segment parallel to each other at regular intervals.

3. An image forming apparatus for forming an image having a plurality of images overlapped in order, comprising:

conveyance means for supporting and conveying the plurality of images in a first direction;

storage means storing first and second pattern data for outputting, onto the conveyance means, first and second pattern images which each have a plurality of line segments extending substantially parallel to each other in a direction perpendicular to the first direction;

first image forming means for forming, on the conveyance means, a first image, and the first pattern image based on the first pattern data stored in the storage means;

second image forming means for forming, on the conveyance means, a second image, and the second pattern image based on the second pattern data stored in the storage means and the second image being output such that it overlaps the first image, the second pattern image being output such that it is located adjacent to the first pattern image in the first direction;

sensing means provided in a position opposed to the conveyance means for sequentially sensing the first and second pattern images which are formed on the conveyance means; and correction means for comparing the numbers of those line segments of the first and second pattern images sensed by the sensing means and correcting the positions of the first and second images to be formed by the first and second image forming means, on the basis of the comparison result, wherein the first and second pattern images output onto the conveyance means each include a plurality of line segments extending at regular intervals parallel to each other in the second direction perpendicular to the first direction, and a plurality of dots arranged in an oblique line such that each of the dots is located between a corresponding pair of adjacent ones of the line segments.

4. An image forming apparatus for forming an image comprising:

conveyance means for supporting and conveying the images, the conveyance means including a conveyance belt for supporting and conveying an image-bearing medium onto which the images is formed, and a pair of rollers for supporting the conveyance belt;

image forming means for forming the image on the image-bearing medium;

sensing means for sensing the amount of displacement of the conveyance means from a regular position of the conveyance means; and enforcement means for forcibly returning the conveyance means to the regular position when the apparatus has been switched on and/or when the sensing means has sensed that the means is displaced from a regular position by a predetermined amount or more.

5. The image forming apparatus according to claim 4, wherein the enforcement means including an enforcement mechanism for urging an end portion of the conveyance belt to return the belt to the regular position when the conveyance belt is displaced in an axial direction of the rollers.

6. The image forming apparatus to claim 4, wherein the enforcement means being mounted on an end of a rotary shaft of at least one of the rollers, and returns the conveyance belt to the regular position by swinging the at least one roller about the other end of the rotary shaft toward the other roller.

7. An image forming apparatus for forming an image having a plurality of images overlapped in order, comprising:

conveyance means for supporting and conveying the plurality of images;

sensing means for sensing the amount of displacement of the conveyance means from a regular position of the conveyance means;

enforcement means for forcibly returning the conveyance means to the regular conveyance position when the apparatus has been switched on and/or when the sensing means has sensed that the conveyance means is displaced from a regular position by a predetermined amount or more;

storage means storing pattern image data, each of first and second pattern images having a plurality of line segments extending parallel to each other in a direction perpendicular to a conveyance direction in which the conveyance means conveys the images;

first image forming means for forming, onto the conveyance means, a first image, and the first pattern image based on the pattern data stored in the storage means;

second image forming means for forming, onto the conveyance means, a second image, and the second pattern image based on the pattern data stored in the storage means, the second image being output such that it overlaps the first image, the second pattern image being output such that it is located adjacent to the first pattern image in the conveyance direction;

sensing means provided in a position opposed to the conveyance means for sensing the first and second pattern images which are formed on the conveyance means; and correction means for correcting the positions of the first and second images to be formed by the first and second image forming means, on the basis of the sensing results of the first and second pattern images.

* * * * *